Dec. 30, 1930. L. J. SIMON 1,787,399
DISTILLATION APPARATUS
Filed June 13, 1927 6 Sheets-Sheet 1
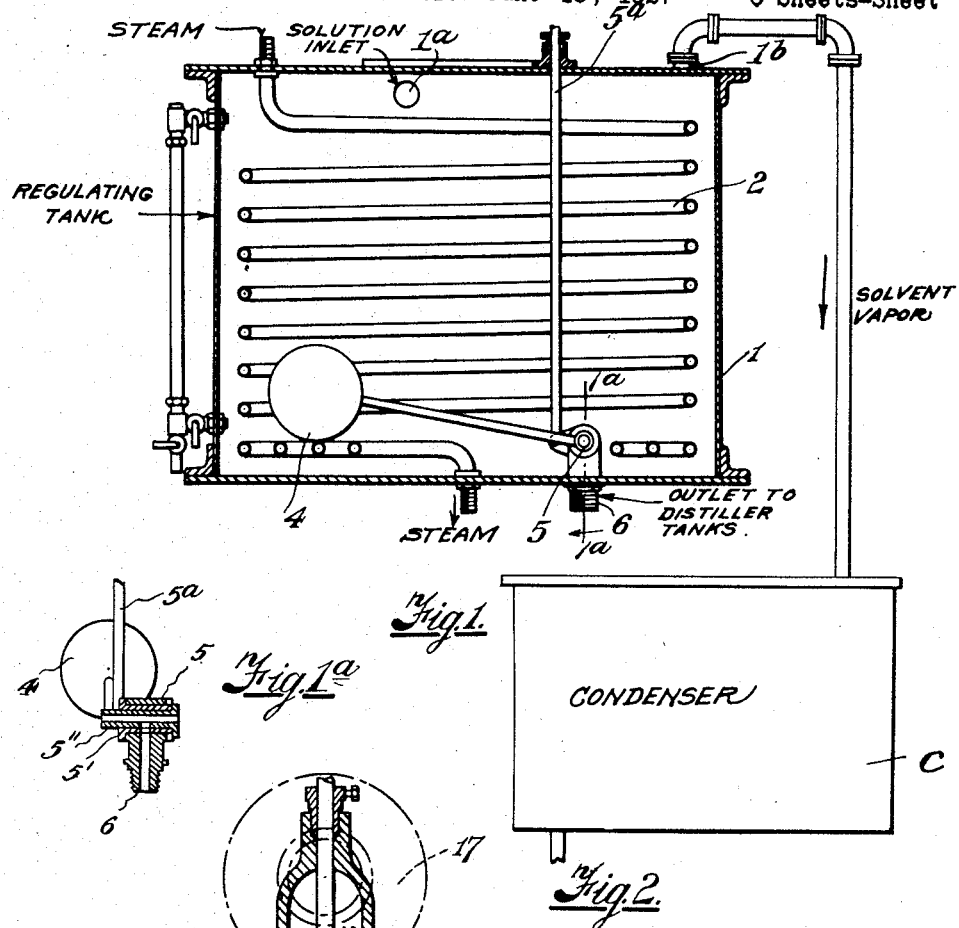
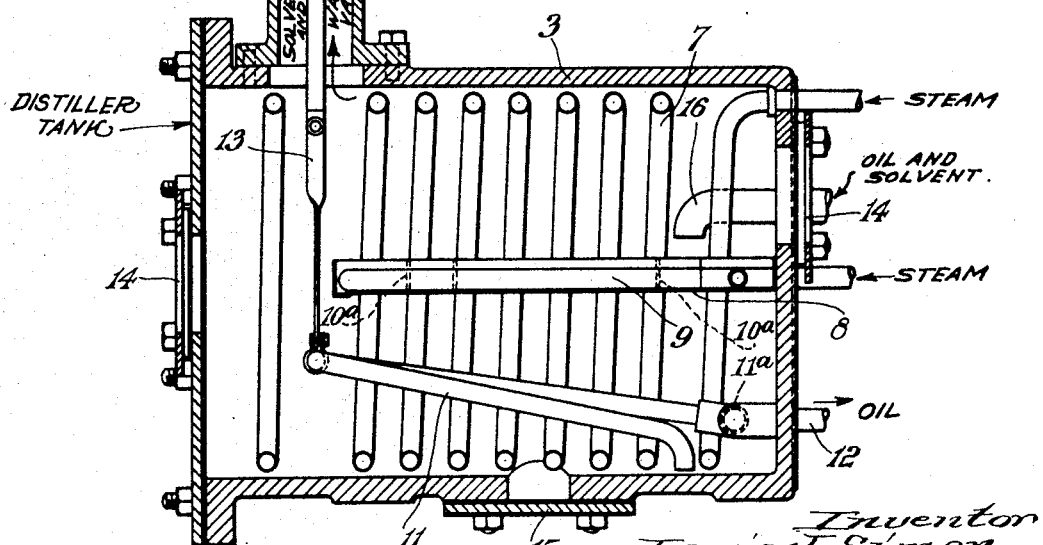
Inventor
Louis J. Simon

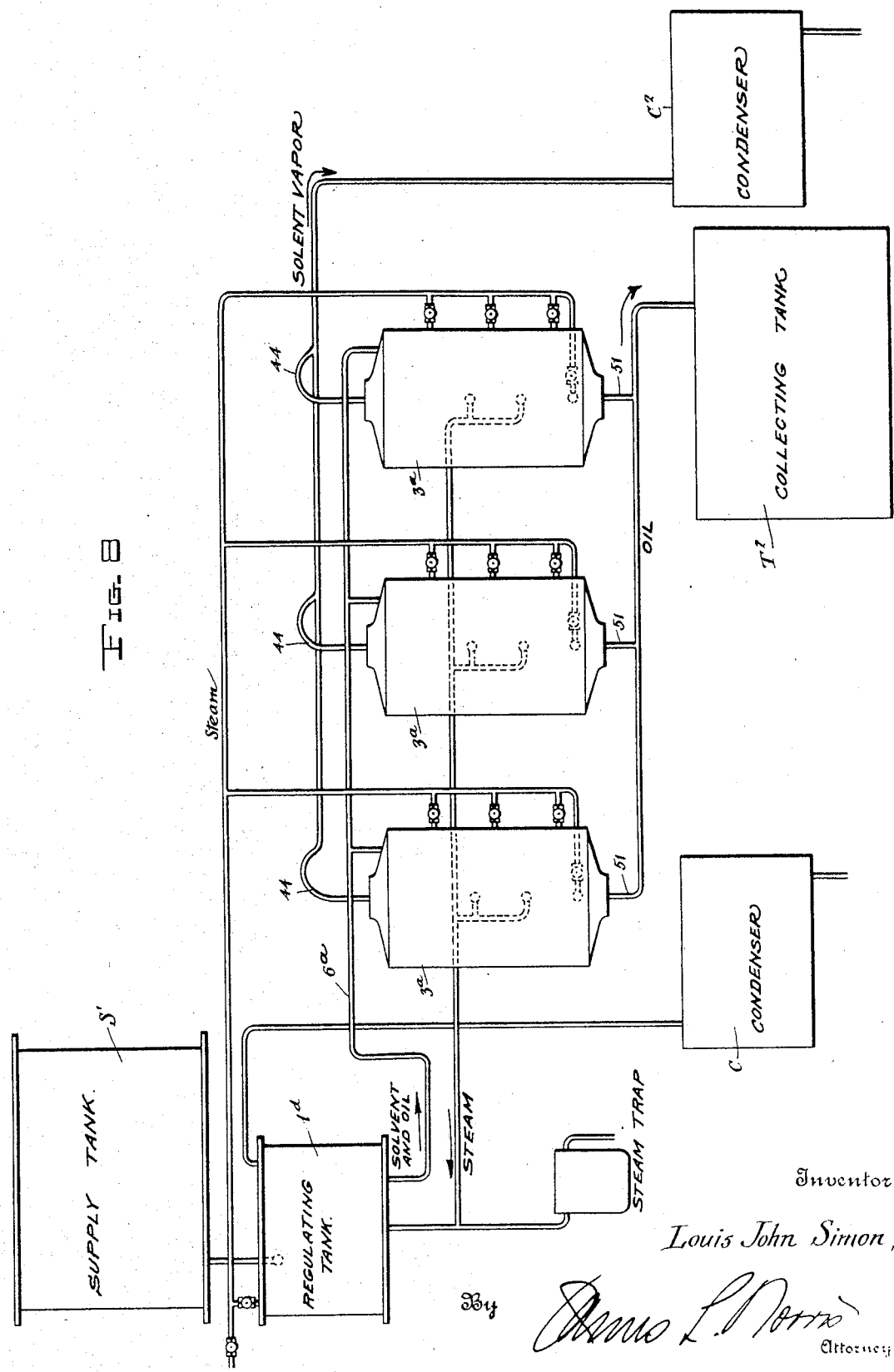

Patented Dec. 30, 1930

1,787,399

UNITED STATES PATENT OFFICE

LOUIS JOHN SIMON, OF LONDON, ENGLAND

DISTILLATION APPARATUS

Application filed June 13, 1927, Serial No. 198,631, and in Great Britain July 19, 1926.

This invention relates to an apparatus for the continuous distillation of the solvent from solutions consisting of a mixture of oils and liquid solvents resulting from solvent extraction and is intended primarily for use in connection with the apparatus described in the application of Louis J. and Abraham Simon for U. S. Patent Serial No. 100,658 where the supplies of solutions from the extractor are intermittent, although the invention is capable of use in connection with other types of solvent extracting plants.

According to the invention means are provided for treating a mixture of oils and solvents in a preliminary distiller which controls the quantity of the solvent to be delivered to and evaporated off by a number of small distiller vessels arranged in parallel or in series parallel, thus providing for a continuous distillation of the liquid under treatment.

It is also one object of this invention to provide float-actuated distribution means located in the preliminary or regulating still, whereby the initial supply of solution in the said still may be fed in a smaller quantity at first, and increased as it becomes more concentrated due to the primary or initial still treatment, the said float-actuated distributing means supplying a greater quantity of the solution in proportion as such solution becomes more concentrated and the level thereof in the still becomes lower, that is as the density of the solution intensifies in the regulating or primary still, so the release thereof to the supplemental still or stills increases.

Reference will now be made to the accompanying drawings which illustrate by way of example constructions according to the invention and in which:—

Figure 1 is a sectional elevation of the regulating still and its adjacent condenser.

Fig. 1ª is a section on line 1ª—1ª of Figure 1,

Figure 2 is a sectional elevation of one of the small stills.

Figure 8 is a diagrammatic view showing the modified form in an installation.

Figure 3:
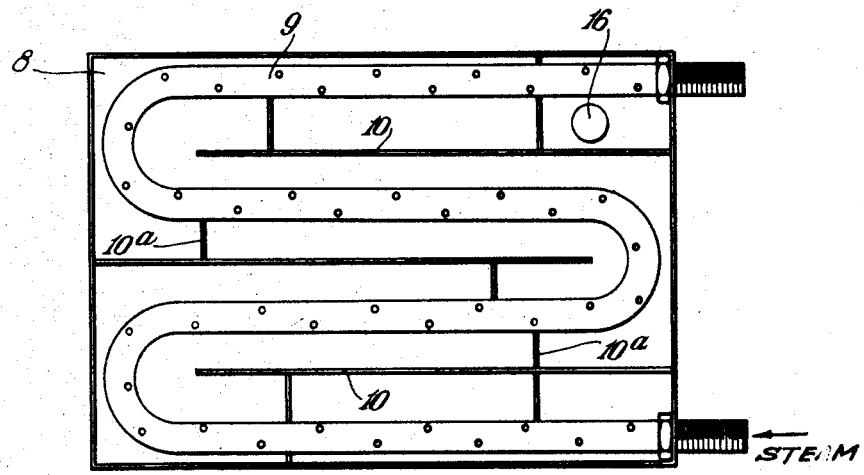
Figure 3 is a plan of the tray used in the small still shown in Figure 2.
Figure 4:
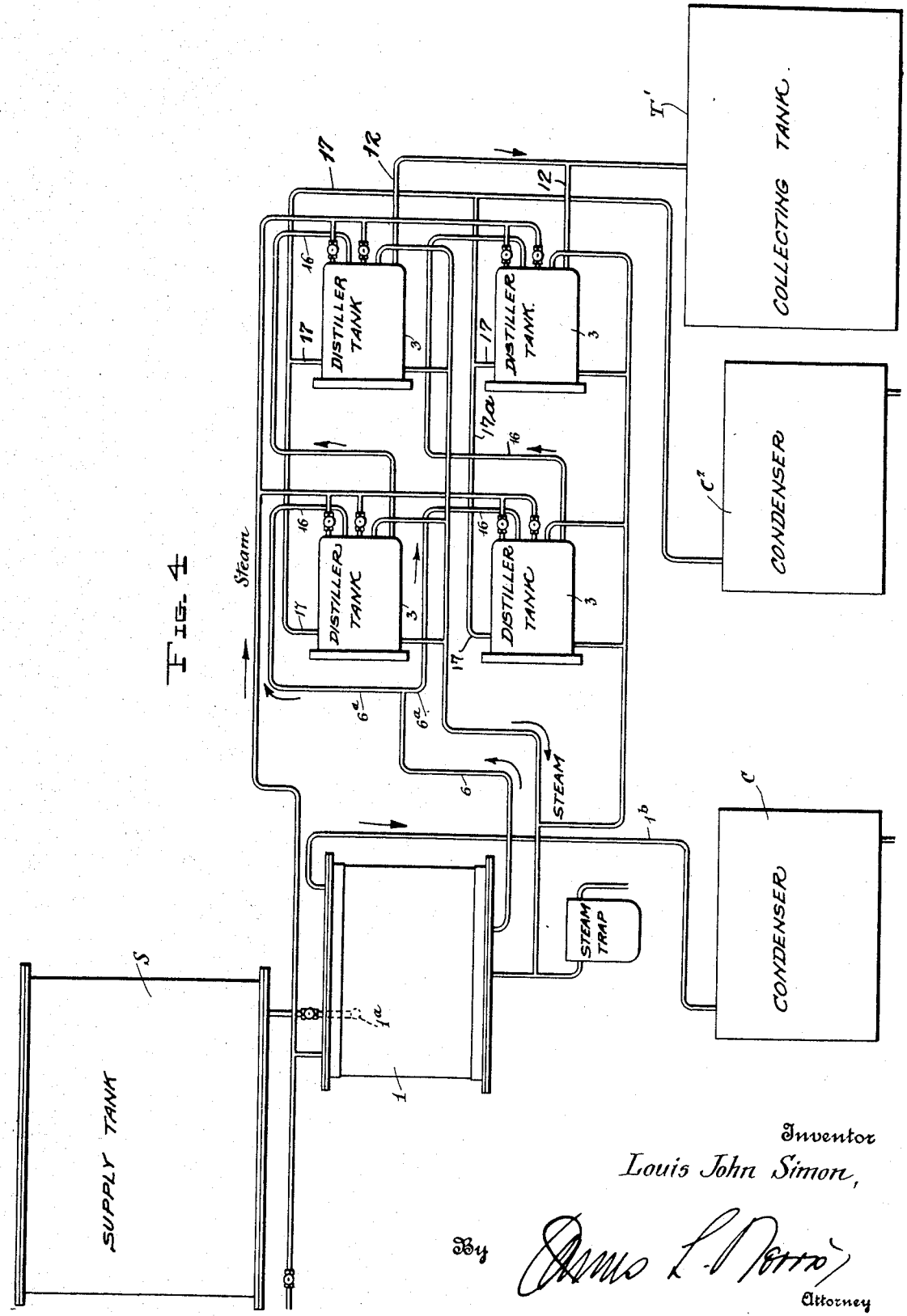
Figure 4 is a diagram showing the manner in which a number of the small stills are connected to the regulating still.
Figure 5:
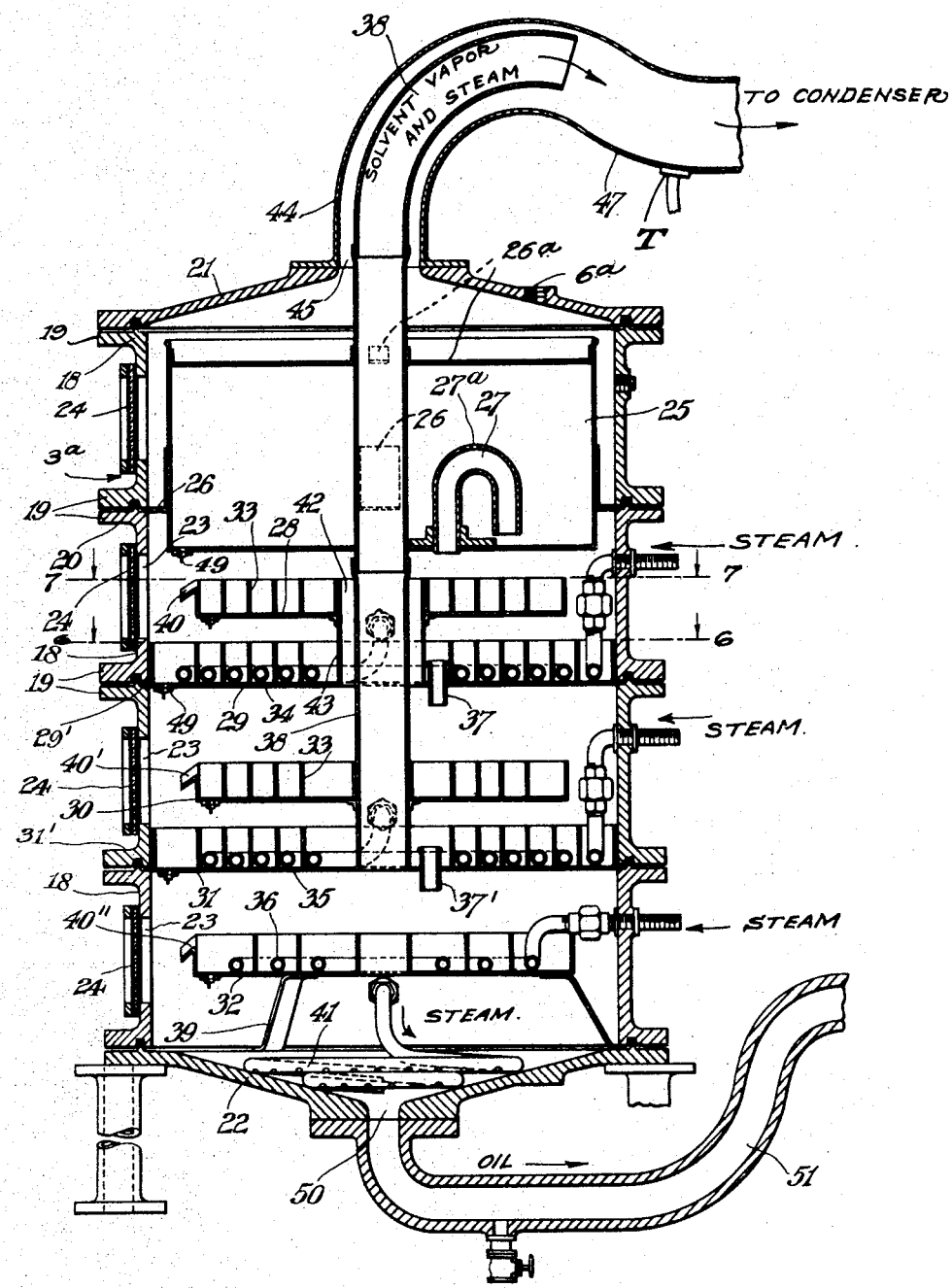
Figure 5 is a sectional elevation of a modified construction in which a number of small stills are embodied in a single assembly.
Figure 6:
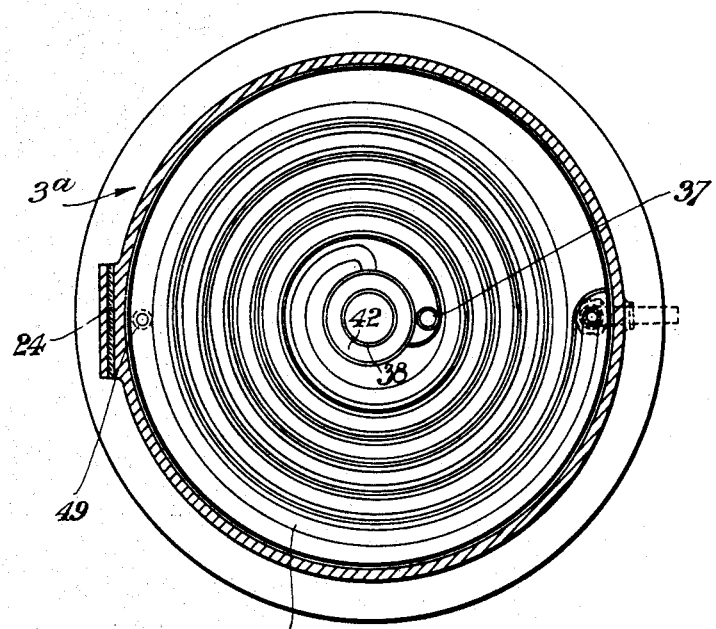
Figure 6 is a section on line 6—6 of Figure 5.
Figure 7:
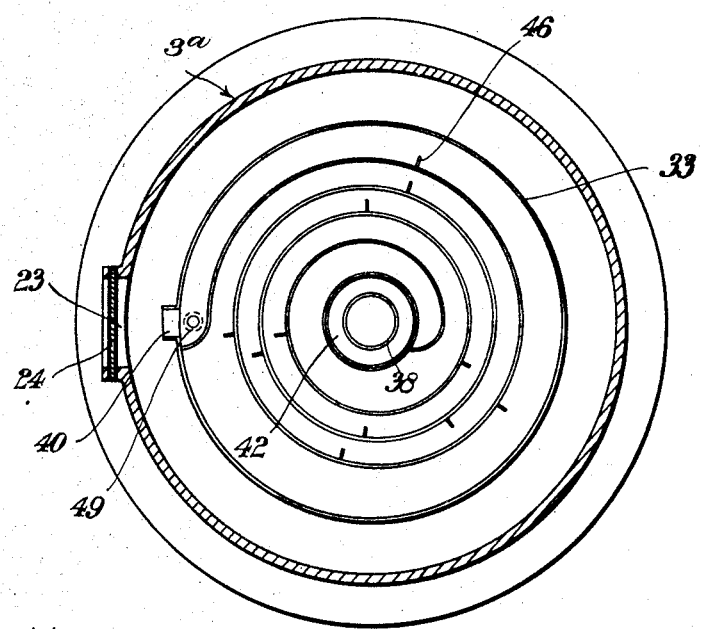
Figure 7 is a plan section on line 7—7 of Figure 5.

In the form of invention illustrated in Figures 1–4, the solution from an extractor or extractors enters a supply tank S and flows from the latter into a regulator tank 1 through the inlet 1ª of the latter. Steam coils 2 mounted in the regulator tank 1 cause said tank to act as a preliminary distiller. The vapor outlet 1ᵇ of the regulator tank 1 is connected to a condenser C. In conjunction with this regulator tank are used four or more small distiller vessels 3, all of which are fed from the regulator tank 1 being connected two or more in series and two sets of series connected vessels being arranged in parallel, or as shown in Figure 4.

Fitted in the preliminary distiller tank 1 is a ball float 4 adapted periodically to operate an outlet valve 5 controlling an outlet pipe 6 feeding the small distiller vessels 3. The outlet valve 5 preferably comprises a pair of concentric sleeves 5' and 5", the inner one of which is partially rotated by movement of the float while the outer sleeve is set in position from the exterior of the tank by means of a crank and rod 5ª, which enables variations to be made in the density of the solution to be distilled. Each sleeve has a perforation formed therein, the two perforations coinciding to a greater or lesser degree according to the position of the float, but the valve thus constituted is never quite closed.

The small distiller vessels 3 contain closed steam coils 7 and the end distiller vessels, that is, the distiller vessels furthest from the preliminary distiller tank may contain both closed and open steaming coils. Each distilling vessel 3 contains a tray 8 in which is disposed a perforated coil 9 for open steaming, this coil being arranged as shown in Figure 3 to pass around baffle plates 10 extending upwardly from the base of the tray. Laterally extending baffle plates 10ª to alter the surface of the solution are disposed at right angles to the coil.

The level of the liquid in the still 3 and the removal of oil from the bottom are controlled by means of a bent pipe 11 pivotally connected at 11ª to an outlet 12 and connected to a rod 13 passing to the exterior of the vessel by means of which the pipe 11 is raised or lowered according to requirements. This bent pipe ensures the removal of the lowest layer of liquid and a small hole, adjacent the connection of the rod 13 thereto, at the uppermost portion of the bent pipe 11 prevents the pipe acting as a siphon.

On opposite sides of the still, glass covered sight openings 14 are provided for inspection of the interior, and the base of the still is provided with the normally closed outlet 15 for use in cleaning out the still when necessary.

Oil and solvent enter the vessel 3 by way of a pipe 16, and an outlet 17 is provided for solvent and water vapour which are directed to a condenser C². (Figure 4). The method of operation of the form of apparatus above described is as follows:—

The solution enters the preliminary distiller tank 1 from the supply tank S and at the time of entry the solution lifts the ball float 4 and operates the sleeve 5″ of the valve 5 in this tank to partially close the outlet 6 to the small distiller vessels 3. The vapourizing of the solvent from the solution by the action of the coils 2 gradually lowers the level of the solution in the preliminary distiller tank 1 causing the float 4 to fall and the valve 5 to open, thus permitting the flow of solution to the small stills 3 faster as the solution becomes more concentrated in the preliminary distiller tank 1 which thus acts as a governor to control the amount of work to be done by the small distiller vessels 3. The fact that the valve 5 is never wholly closed, coupled with the action of the float 4, ensures continuous discharge to the small stills irrespective of irregularities in the supply to the regulator tank. It will thus be evident that by the use of this ball valve, a constantly varying feed of a constantly varying density of solution is governed, that is, as density of the solution intensifies, so the supply of the solution increases.

As regards the operation of the valve 5, it will be noted from Fig. 1ª, that this valve is so constructed that as the float 4 is lowered by a fall in liquid level in the tank 1, the valve 5 opens wider and allows a faster flow of solution from the tank 1 to the stills. When a quantity of solution passes into the tank 1, the ball float 4 rises, with the result that the outlet from the valve 5 is restricted and the rate of flow of solution from the tank 1 to the stills is reduced. As the solution in the tank 1 becomes more concentrated, owing to the distillation taking place in the tank 1, the liquid level in this tank is lowered, with the result that the valve 5 opens wider and a faster stream of solution is delivered through the outlet 6 to the supplemental still or stills 3. The supply of solution from the regulating still 1 to the remaining stills 3 is, therefore, regulated automatically in accordance with the degree of concentration of the solution delivered, a more concentrated solution being delivered at a faster rate than a less concentrated one, for the reason that a more concentrated solution requires less evaporation in the remaining stills.

The diagram Figure 4 shows one method of connecting the small distiller vessels with the regulating tank. In this arrangement the regulating tank 1 is connected in parallel to two series of distiller tanks 3 by means of a branched connection 6ª and the tanks 3 are connected to a condenser C² by pipes 17ª.

The small distiller vessels 3 being divided into two sets results in half the quantity only of solution being dealt with by each set, having the effect of doubling the time of travel of the solution over the coil in the tray and so provides an excessive surface area for the solvent to leave the solution.

The small distiller vessels 3 being connected in pairs in series are so arranged that the solution leaves one distiller vessel of one pair, drops on to the tray in the next distiller, and finally is delivered to the collecting tank T' through pipes 12.

An alternative construction of distiller is shown in Figures 5, 6, 7 and 8, in which instead of the regulator tank 1 feeding a number of entirely separate small distiller elements 3, by an assembly of superimposed distiller elements in one casing 3ª is employed. Each casing 3ª has a number of superposed tubular elements or rings 18, each being provided with flanges 19 at top and bottom to facilitate interconnection. Packing members 20 are interposed between the elements 18 to provide fluid tight joints between the flanges 19. The casing thus formed is completed by a cover 21 and base 22 while each element 18 is provided with a hand- or man-hole 23 closed by a glass cover or door 24 for inspection purposes. Near the top within the casing 3ª is disposed a tank 25 open at the top and supported by brackets 26 clamped between the flanges 19 of the uppermost pair of rings or elements 18, the outlet from said tank being constituted by a U-shaped tubular pipe 27 which determines the level which must be attained by the liquid before any can escape from the tank. At the uppermost point of this pipe a perforation 27ª is formed to prevent the pipe from acting as a siphon. The tank 25 acts as a preliminary evaporator, the heat being obtained from vapors resulting from distillation as hereinafter described.

Below the tank 25 are superposed trays 28, 29, 30, 31 and 32, through each of which in series the liquid under treatment is caused to circulate. The trays are each provided with spiral channels 33 having cross baffle plates 46 and trays 29, 31 and 32 are provided with steam heated coils 34, 35 and 36, respectively, disposed concentrically with the channels, and the coil 36 is preferably an open or perforated coil. The outlets from the trays 29 and 31 are constituted by tubular members 37 and 37′, respectively, which frictionally engage the opening so as to be adjustable so as to vary the level at which the solution may leave the tray and consequently its period of treatment in each tray. The outlets from trays 28, 30 and 32 are constituted by lips 40, 40′ and 40″ near the upper edges of the trays and the outlets from all the trays are so located that the solution under treatment is caused to flow in a spiral course from the centre of the uppermost tray towards its periphery where the discharge element is situated, the course of the solution in the next succeeding tray of the series being from the periphery towards its centre where the tubular element 37 or 37′ allows it to pass into the central portion of tray 30 or 32. The succeeding trays are similarly arranged.

Tray 28 is supported at its centre from tray 29 by the short pipe 43 and trays 29 and 31 are provided with annular peripheral flanges 29′ and 31′, respectively, adapted to be clamped between the flanges 19 of adjacent elements 18. Tray 30 is supported from a central outlet pipe 38 for the escape of solvent vapor and steam, said pipe extending upwardly from the space below the tray 31. The tray 32 is supported by brackets 39, the lower flanged ends of which are clamped between the flange 19 of the lowest element 18 and the base 32. In the base of the casing is disposed a perforated steam heated coil 41.

The space above the trays 30 and 31 communicates with the space immediately beneath the tank 25 by means of an annular passage 42 formed by the short pipe 43 which as before noted also supports the tray 28 from the tray 29 and is disposed concentrically around the vapor outlet pipe 38. This pipe 38 extends partially into a main vapor exhaust 44 secured in position around a central outlet opening 45 in the cover 21, said pipe 44, as shown in Figure 8, communicating with a condenser $C^2$ and being preferably provided with a trap T at the curved portion 47 for condensed solvent and steam to avoid the entry of water to the tank 25. The tank 25 and the trays below it are each provided with a screw-threaded plug 49 for drainage purposes, each of these plugs being disposed within a convenient distance of a hand-hole 23. At the base of the apparatus is provided an outlet 50 for oil and it communicates with a U-shaped outlet pipe 51 so arranged that the level of oil in the vessel is kept slightly below the tray 32 and by means of which the oil is delivered to the collecting tank $T^2$.

Two or more such apparatus with superimposed trays are preferably connected in parallel with a regulating tank 1 of the form already described and as particularly shown in Fig. 8. In this installation the supply tank S′ supplies the regulating still $1^d$, and from this, as in the diagram shown in Fig. 4, the solution is fed through pipe 6 to three stills $3^a$, the vapors from the said stills being delivered through the pipes 44 to the condenser $C^2$, while the oil is drained through the pipe 51 to the collecting tank $T^2$.

Thus it will be seen that a continuous distillation process for a solution containing oil and solvents is provided.

Although three supplemental or secondary stills are shown in Fig. 4, it is evident that a single secondary still can be used, as this type of still provides for a plural stage evaporation and in some cases only one will be necessary.

I claim:—

1. A distillation apparatus including a casing, a centrally disposed condensation outlet extending from near the bottom of the casing through the top thereof, an oil outlet at the lower end of said casing, a tank open at its top mounted in said casing adjacent the upper end thereof, said tank having an outlet through its bottom, a plurality of evaporating trays mounted in the casing below the tank, said tank emptying into the uppermost tray and each succeeding tray emptying into the tray immediately below it, and steam-heating coils in certain of said trays, the lowermost tray delivering the separated oil to the oil outlet while the gases of condensation pass upwardly from the tank and trays through the condensation outlet.

2. A solution distillation still including a main casing, a condensation conduit extending through the top of said casing to a point near the bottom thereof, said casing having an oil outlet at its lower end, an open tank mounted in the upper portion of the casing and spaced from the walls thereof, an outlet conduit associated with said tank for directing solution from said tank, said conduit having means to maintain the solution in said tank at a constant level, a plurality of trays mounted in superposed relation within the casing below said tank, each of said trays being provided with a circuitous spiral wall forming a spiral channel leading from the center to the periphery thereof, the uppermost tray being adapted to receive the solution from the outlet conduit of the tank, and each of said trays discharging into the tray immediately below it, the discharge outlets of said trays being alternately at the peripheries and at the axes of the trays, and means for heating certain of said trays to volatilize the solvents of the solution as it passes through such trays.

3. A solution distillation still including a main casing composed of a plurality of superposed annular flanged members and a top and bottom member, a condensation directing tube disposed concentrically of said top member and extending to near the bottom of the casing, the bottom member having an oil outlet, a tank open at its upper end mounted in the upper part of the casing and supported between the flanges of the two upper annular members, said tank having a solution outlet through the lower portion thereof, a pair of double tray members each comprising an upper tray and a lower tray of larger dimensions, the lower member having a flange for interposition between the flanges of the adjacent annular members whereby the two trays are supported within the casing, the upper tray having a peripheral outlet for directing the solution into the outer portion of the larger tray, and the larger tray having an outlet adjacent the center thereof for directing the solution into the tray immediately below it, a steam heating coil mounted in each of the larger trays, and a tray mounted in the lower portion of the casing to receive the solution from the lowest enlarged tray.

In witness whereof I affix my signature.

LOUIS JOHN SIMON.